(12) United States Patent
Liu (10) Patent No.: US 9,317,316 B2
(45) Date of Patent: Apr. 19, 2016

(54) HOST VIRTUAL MACHINE ASSISTING BOOTING OF A FULLY-ENCRYPTED USER VIRTUAL MACHINE ON A CLOUD ENVIRONMENT

(71) Applicant: Huawei Technologies Co., Ltd., Shenzhen (CN)

(72) Inventor: Xinbao Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 307 days.

(21) Appl. No.: 13/714,003

(22) Filed: Dec. 13, 2012

(65) Prior Publication Data

US 2013/0173900 A1    Jul. 4, 2013

Related U.S. Application Data

(63) Continuation of application No. PCT/CN2011/084823, filed on Dec. 28, 2011.

(51) Int. Cl.
*G06F 9/445* (2006.01)
*G06F 9/455* (2006.01)
*G06F 9/44* (2006.01)
(Continued)

(52) U.S. Cl.
CPC .......... *G06F 9/45558* (2013.01); *G06F 9/4406* (2013.01); *G06F 21/575* (2013.01); *H04L 9/08* (2013.01); *G06F 2221/2107* (2013.01)

(58) Field of Classification Search
CPC .......... G06F 2221/2107; G06F 21/575; G06F 9/4406; G06F 9/45558; G06F 9/4401; H04L 9/08; G06T 15/0019

USPC .............................................................. 713/2
See application file for complete search history.

(56) References Cited

U.S. PATENT DOCUMENTS

| 5,732,268 | A | * | 3/1998 | Bizzarri | 713/2 |
| 7,865,712 | B2 | | 1/2011 | Levit-Gurevich et al. | |
| 8,234,640 | B1 | * | 7/2012 | Fitzgerald et al. | 718/1 |

(Continued)

FOREIGN PATENT DOCUMENTS

| CN | 1714331 A | 12/2005 |
| CN | 102163266 A | 8/2011 |
| WO | WO 2011/156261 A1 | 12/2011 |

OTHER PUBLICATIONS

International Search Report issued in corresponding PCT Patent Application No. PCT/CN2011/084823, mailed Oct. 4, 2012.

*Primary Examiner* — Thomas Lee
*Assistant Examiner* — Santosh R Poudel
(74) *Attorney, Agent, or Firm* — Brinks Gilson & Lione (57) ABSTRACT

The disclosure provides a key transmission method and device of a virtual machine under full disk encryption during pre-boot. The method includes: pre-booting the virtual machine, where the virtual machine is in a full disk encryption state; during the pre-boot, establishing, by the virtual machine, a transmission channel with a cloud platform, where the cloud platform is configured to provide a key; requesting, by the virtual machine, the key from the cloud platform through the transmission channel, and receiving the key sent by the cloud platform; and decrypting, by the virtual machine, an operation system by using the key, and booting the operation system. In embodiments of the present disclosure, key transmission may be implemented during a pre-boot phase of the virtual machine, so as to boot the virtual machine.

7 Claims, 4 Drawing Sheets

(51) Int. Cl.
*H04L 9/08* (2006.01)
*G06F 21/57* (2013.01)

(56) References Cited

U.S. PATENT DOCUMENTS

| | | | | |
|---|---|---|---|---|
| 8,391,494 | B1* | 3/2013 | Serenyi | 380/278 |
| 8,413,146 | B1* | 4/2013 | McCorkendale et al. | 718/1 |
| 8,560,826 | B2* | 10/2013 | Wu et al. | 713/2 |
| 8,924,700 | B1* | 12/2014 | Karmarkar et al. | 713/2 |
| 2002/0194313 | A1* | 12/2002 | Brannock | 709/220 |
| 2004/0103299 | A1 | 5/2004 | Zimmer et al. | |
| 2007/0061597 | A1* | 3/2007 | Holtzman et al. | 713/193 |
| 2008/0028071 | A1* | 1/2008 | Miyajima | 709/224 |
| 2008/0072222 | A1* | 3/2008 | Bantz et al. | 718/1 |
| 2008/0082447 | A1* | 4/2008 | Jogand-Coulomb et al. | 705/53 |
| 2008/0155169 | A1* | 6/2008 | Hiltgen et al. | 711/6 |
| 2008/0181397 | A1* | 7/2008 | Dorminy | 380/30 |
| 2008/0250407 | A1* | 10/2008 | Dadhia et al. | 718/1 |
| 2009/0125974 | A1* | 5/2009 | Zhang et al. | 726/1 |
| 2009/0172781 | A1* | 7/2009 | Masuoka et al. | 726/3 |
| 2009/0282266 | A1* | 11/2009 | Fries et al. | 713/193 |
| 2010/0058042 | A1* | 3/2010 | Locker et al. | 713/2 |
| 2010/0070743 | A1* | 3/2010 | Grigor et al. | 713/1 |
| 2010/0082991 | A1* | 4/2010 | Baldwin et al. | 713/176 |
| 2010/0093433 | A1* | 4/2010 | Tomicic et al. | 463/31 |
| 2010/0153696 | A1* | 6/2010 | Beachem et al. | 713/2 |
| 2010/0180014 | A1* | 7/2010 | Kannan et al. | 709/220 |
| 2010/0275251 | A1* | 10/2010 | Gross et al. | 726/6 |
| 2010/0303240 | A1* | 12/2010 | Beachem et al. | 380/277 |
| 2011/0022695 | A1* | 1/2011 | Dalal et al. | 709/222 |
| 2011/0078497 | A1* | 3/2011 | Lyne et al. | 714/15 |
| 2011/0141124 | A1* | 6/2011 | Halls | G06F 21/83 345/522 |
| 2011/0202765 | A1 | 8/2011 | McGrane et al. | |
| 2011/0246767 | A1* | 10/2011 | Chaturvedi et al. | 713/164 |
| 2011/0271279 | A1* | 11/2011 | Pate | 718/1 |
| 2011/0276684 | A1* | 11/2011 | Singh et al. | 709/224 |
| 2011/0289555 | A1* | 11/2011 | DeKoenigsberg et al. | 726/3 |
| 2011/0296157 | A1* | 12/2011 | Konetski et al. | 713/2 |
| 2011/0302400 | A1* | 12/2011 | Maino et al. | 713/2 |
| 2011/0302415 | A1* | 12/2011 | Ahmad | G06F 21/57 713/168 |
| 2012/0060153 | A1* | 3/2012 | Bealkowski | 718/1 |
| 2012/0151200 | A1* | 6/2012 | Beachem et al. | 713/2 |
| 2012/0159469 | A1* | 6/2012 | Laor | 717/173 |
| 2012/0173866 | A1* | 7/2012 | Ashok et al. | 713/150 |
| 2012/0179904 | A1* | 7/2012 | Dunn et al. | 713/155 |
| 2012/0246282 | A1* | 9/2012 | Oguchi | 709/221 |
| 2012/0265976 | A1* | 10/2012 | Spiers et al. | 713/2 |
| 2012/0331461 | A1* | 12/2012 | Fries et al. | 718/1 |
| 2013/0067470 | A1* | 3/2013 | Chen et al. | 718/1 |
| 2013/0232329 | A1* | 9/2013 | Marinelli et al. | 713/2 |
| 2013/0268757 | A1* | 10/2013 | Kulkarni et al. | 713/168 |
| 2013/0346977 | A1* | 12/2013 | Rasmusson | 718/1 |

* cited by examiner

HOST VIRTUAL MACHINE ASSISTING BOOTING OF A FULLY-ENCRYPTED USER VIRTUAL MACHINE ON A CLOUD ENVIRONMENT

CROSS-REFERENCE TO RELATED APPLICATIONS

This application is a continuation of International Application No. PCT/CN2011/084823, filed on Dec. 28, 2011, which is hereby incorporated by reference in its entirety.

FIELD OF THE DISCLOSURE

The present disclosure relates to the field of communications technologies, and in particular, to a key transmission method and device of a virtual machine (Virtual Machine, VM) under full disk encryption during pre-boot.

BACKGROUND

In a cloud computing scenario, magnetic disk data of a virtual machine (Virtual Machine, VM), including data of a system disk and of a data disk, is under a security risk. If full disk encryption is performed on VM data and a key is held by a user, unauthorized personnel are incapable of obtaining data of the user. In this way, sensitive data of the user in the cloud is protected to a great degree.

A conventional full disk encryption technology, as a solution to terminal security, is already mature. In the conventional technology, before booting an operation system, that is, in a pre-boot (Pre-boot) phase, a key may be generated by a boot loader (boot loader) program according to a password input by the user. Data on the magnetic disk is decrypted by use of the key. The decrypted data includes an operation system (Operation System, OS), and the operation system may be booted after being decrypted.

In the foregoing conventional full disk encryption technology, the user executes an operation on a single terminal, and the boot loader program may obtain the key. However, in a cloud application scenario, a key needed by the VM needs to be obtained from an external cloud platform. Before the operation system of the VM is booted, the VM does not have an IP address and is incapable of communicating with the outside, thereby being incapable of obtaining the key. Therefore, the operation system of the VM cannot be booted, which causes the VM to be halted in the pre-boot phase.

SUMMARY

The present disclosure provides a key transmission method and device of a virtual machine under full disk encryption during pre-boot, so that a boot loader program in the VM may obtain a key in a pre-boot phase to boot an operation system of the VM.

The present disclosure provides a key transmission method of a virtual machine under full disk encryption during pre-boot, including: pre-booting the virtual machine, where the virtual machine is in a full disk encryption state; during the pre-boot, establishing, by the virtual machine, a transmission channel with a cloud platform, where the cloud platform is configured to provide a key; requesting, by the virtual machine through the transmission channel, a key from the cloud platform, and receiving the key sent by the cloud platform; and decrypting, by the virtual machine, an operation system by using the key, and booting the operation system.

The present disclosure provides a key transmission device of a virtual machine under full disk encryption during pre-boot, including: an establishing module, configured to pre-boot the virtual machine in a full disk encryption state, and establish a transmission channel with a cloud platform during the pre-boot, where the cloud platform is configured to provide a key; a transmitting module, configured to request, through the transmission channel, a key from the cloud platform, and receive the key sent by the cloud platform; and a decrypting module, configured to decrypt an operation system by using the key and boot the operation system.

It may be known from the foregoing solutions that, in embodiments of the present disclosure, during the pre-boot phase, the virtual machine establishes the transmission channel with the cloud platform that provides the key, implementing the key transmission during the pre-boot phase, so that the virtual machine is capable of obtaining the key, thereby decrypting the operation system of the virtual machine and booting the operation system of the virtual machine, and avoiding halting in the pre-boot phase due to incapability of obtaining the key.

BRIEF DESCRIPTION OF THE DRAWING

To illustrate the solutions according to embodiments of the present disclosure more clearly, accompanying drawings for describing the embodiments are introduced briefly in the following. Obviously, the accompanying drawings in the following description are only some embodiments of the present disclosure, and persons of ordinary skill in the art may derive other drawings from these accompanying drawings without making creative efforts.

DETAILED DESCRIPTION OF THE EMBODIMENTS

In order to make the objectives, solutions, and advantages of the present disclosure more clear, the solutions according to embodiments of the present disclosure are clearly and completely described in the following with reference to the accompanying drawings. Obviously, the embodiments described are merely part of rather than all of the embodiments of the present disclosure. All other embodiments obtained by persons of ordinary skill in the art based on the embodiments of the present disclosure without making creative efforts shall fall within the protection scope of the present disclosure.

Figure 1:
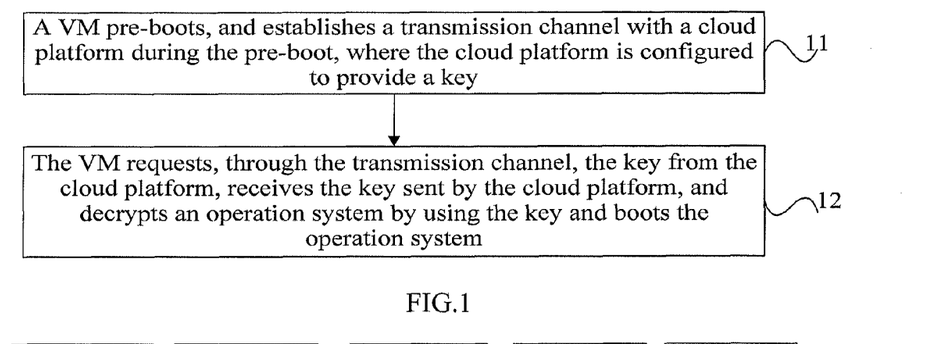
FIG. 1 is a schematic flow chart of a key transmission method of a virtual machine under full disk encryption during pre-boot according to an embodiment of the present disclosure.

FIG. 1 is a schematic flow chart of a key transmission method of a virtual machine under full disk encryption during pre-boot according to an embodiment of the present disclosure. The method includes:

Step 11: A VM pre-boots, and establishes a transmission channel with a cloud platform during the pre-boot, where the cloud platform is configured to provide a key.

The VM is in a full disk encryption state during the pre-boot. That is, an operation system of the VM is in an encrypted state, and the operation system of the VM needs to be decrypted in order to complete the boot of the VM; otherwise the VM is halted in a pre-boot state as in the prior art.

The VM refers to a virtual machine that is used by a user. For example, in an XEN scenario, the VM refers to a Domain U. In addition, in the XEN scenario, a special virtual machine further exists, namely, a host (Domain 0). The host is not a virtual machine used by a user, but a virtual machine that manages each Domain U. Therefore, in the XEN scenario, the foregoing VM refers to the Domain U. It may be understood that, for a scenario of other virtualization platforms where the Domain 0 and Domain U are not distinguished, for example, in a VMware ESXi scenario, a function of the Domain 0 may be executed by a hypervisor, and an operation executed by the Domain U may be executed by a virtual machine on the hypervisor.

Generally speaking, an operation system of the Domain 0 is not encrypted. Therefore, after the cloud platform delivers, to the Domain 0, an instruction to boot the virtual machine, the operation system of the Domain 0 is booted. However, a system disk of the Domain U, that is, the disk where the operation system is located, is encrypted and needs decryption before being booted. A key of each Domain U may be stored in the cloud platform.

Modules which are in the cloud platform and relate to VM magnetic disk encryption may be further subdivided into a key management module and an encryption management module. The key management module is configured to manage the key of each Domain U, for example, generating a key corresponding to each Domain U, updating a key, storing a key, backing up a key, restoring a key, and so on. The encryption management module is configured to determine a management policy, for example, configuring information of a Domain U needing to be encrypted and configuring information of a volume needing to be encrypted on the Domain U. In addition, the encryption management module is also responsible for transferring a key in the key management module to the Domain U.

In addition, the foregoing transmission channel may be a transmission channel via the hypervisor (hypervisor), or a transmission channel directly established with the cloud platform by use of an IP address. Reference may be made to the subsequent embodiments for specific content.

Step 12: The VM requests, through the transmission channel, the key from the cloud platform, receives the key sent by the cloud platform, and decrypts the operation system by using the key and boots the operation system.

Because the transmission channel has already been established between the cloud platform and the VM, the cloud platform may transmit the key to the VM through the transmission channel.

After obtaining the key, the VM may decrypt, according to the obtained key, the system disk where the operation system is located, and boot the operation system after obtaining the operation system, instead of being halted in a pre-boot phase as in the prior art.

In this embodiment, during the pre-boot phase, the transmission channel with the cloud platform that provides the key is established, implementing the key transmission during the pre-boot phase, so that the virtual machine is capable of obtaining the key, thereby decrypting the operation system of the virtual machine and booting the operation system of the virtual machine, and avoiding halting in the pre-boot phase due to incapability of obtaining the key.

Figure 2:
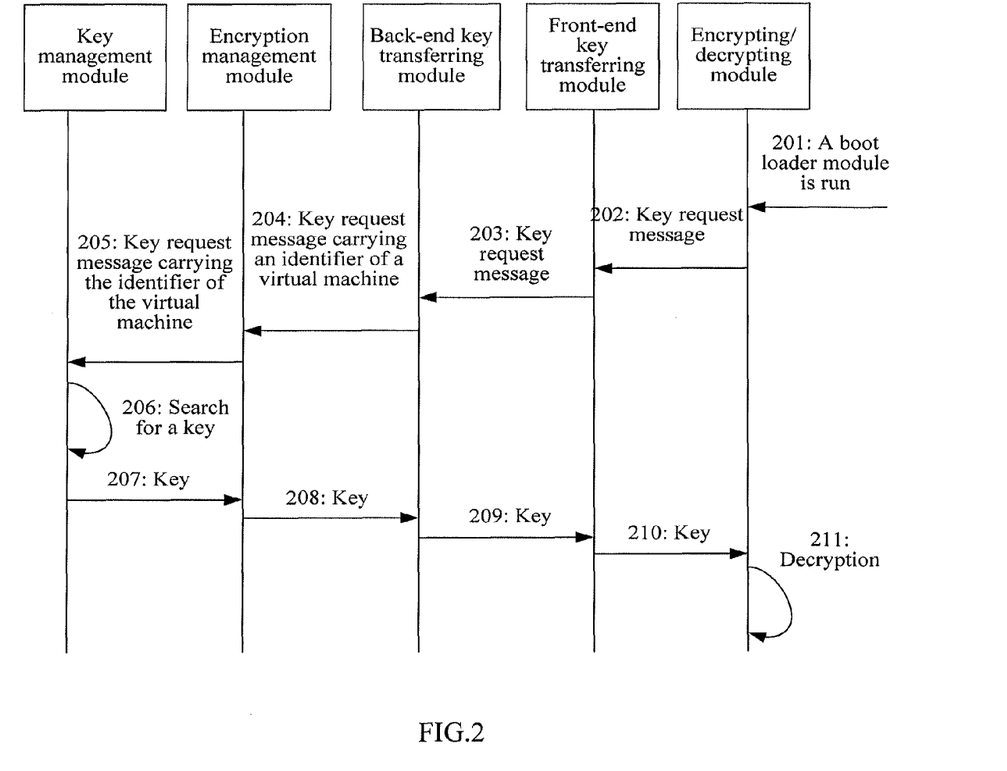
FIG. 2 is a schematic flow chart of a key transmission method of a virtual machine under full disk encryption during pre-boot according to another embodiment of the present disclosure.
Figure 3:
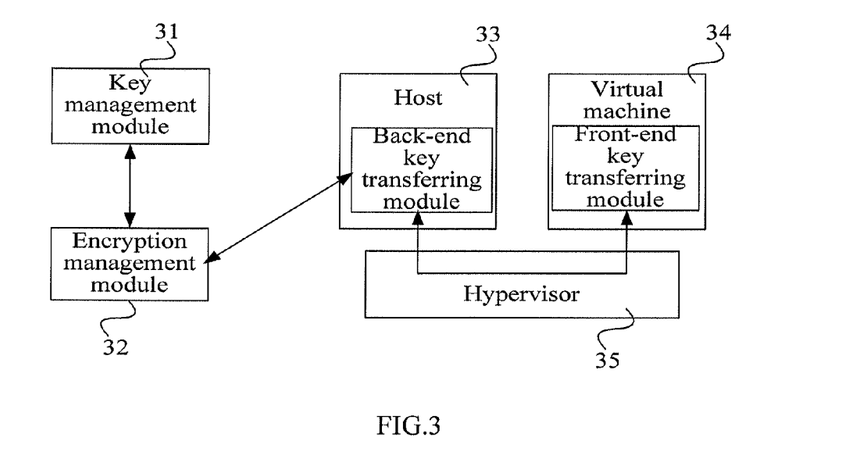
FIG. 3 is a schematic structural diagram of a system corresponding to FIG. 2.

FIG. 2 is a schematic flow chart of a key transmission method of a virtual machine under full disk encryption during pre-boot according to another embodiment of the present disclosure, and FIG. 3 is a schematic structural diagram of a system corresponding to FIG. 2. In this embodiment, an XEN scenario and a transmission channel established via a hypervisor is taken as an example.

Referring to FIG. 3, the system includes a key management module 31, an encryption management module 32, a host 33, the virtual machine 34, and a hypervisor (hypervisor) 35. The key management module 31 and the encryption management module 32 may be located in a cloud platform. The host 33, the virtual machine 34, and the hypervisor 35 may be located on a cloud server. One cloud platform may manage multiple cloud servers. The host is a Domain 0, and the virtual machine is a Domain U.

The key management module is configured to manage a key of each virtual machine, including functions of generating a key, updating a key, storing a key, backing up a key, and restoring a key. The key management module may be set by a cloud provider, and may also be set by a user. For example, in some application scenarios, if the user does not trust the cloud provider and requires to input a key corresponding to the virtual machine manually, the key may be managed by the user. At this time, the key management module may be a self-assistant portal (portal) key input system.

The encryption management module mainly manages which VM or VMs need to be encrypted and which volume or volumes of the VM(s) are encrypted. The user may make a choice according to a degree of sensitivity of data on a magnetic disk. Meanwhile, the module also undertakes a function of key transfer, transferring the key in the key management module to the virtual machine for use.

The host is deployed with a back-end key transferring module, configured to obtain the key from the cloud platform and transmit the key to a front-end key transferring module through a transmission channel in the hypervisor.

The hypervisor is a "meta" operation system in a virtual environment, and may access all physical devices including the magnetic disk and a memory on the cloud server. When the cloud server boots and executes the hypervisor, the hypervisor loads operation systems of all virtual machines and allocates a proper quantity of a memory, a CPU, a network, and a magnetic disk to each virtual machine. For example, the hypervisor may be an open-source XEN.

Each virtual machine may be deployed with an encryption agent (Agent) module, configured to perform encryption/decryption management of the virtual machine. For example, the user delivers an encryption instruction via the encryption agent module, encrypts data of the VM according to the key, or decrypts the encrypted data according to the key. In this embodiment, an encryption agent module including a boot loader module is taken as an example. The boot loader module is configured to run a boot loader program. The boot loader program may read the data including an encrypted operation system from the magnetic disk of the virtual machine, decrypt the operation system by using the key, and then boot the operation system. For example, the boot loader module may include a front-end key transferring module and an encrypting/decrypting module. The front-end key transferring module is configured to obtain the key. The encrypting/decrypting module is configured to encrypt/decrypt data according to the key obtained by the front-end key transferring module. In addition, in a pre-boot phase, the hypervisor may also virtually obtain a virtual basic input output system (Virtual Basic Input Output System, vBIOS) on the virtual machine.

Referring to FIG. 2 in combination with the system shown in FIG. 3, the method provided in this embodiment includes:

Step 201: Perform a boot procedure, including running of a boot loader (boot loader) module, where the boot loader module may include an encrypting/decrypting module and a front-end key transferring module.

For example, a cloud server is booted, a Domain 0 is booted, and a hypervisor is run.

Because the Domain 0 is not encrypted, after the cloud server is booted, the Domain 0 is booted. After being booted, the Domain 0 may obtain an IP address, and may establish a communication connection with a cloud platform side by using the IP address, and may establish a connection with an encryption management module, so as to exchange data with the cloud platform.

The cloud platform performs a pre-boot operation on a Domain U, boots the boot loader module during a pre-boot operation procedure, and allocates a transmission channel with the Domain 0 to each Domain U in the hypervisor when booting the Domain U.

For example, the pre-boot operation may include:

The encryption management module sends, to the Domain 0, an instruction to boot a virtual machine.

The Domain 0 forwards, to the hypervisor, the instruction to boot the virtual machine.

After receiving the instruction to boot the virtual machine, the hypervisor boots the Domain U, obtains a vBIOS corresponding to the Domain 0 by virtualization, and loads a system volume file of the Domain U. The system volume file includes a part of data that does not need to be encrypted, and includes another part of data that needs to be encrypted. The data that does not need to be encrypted may be, for example, a boot loader program, a master boot record (Master Boot Record, MBR) of the magnetic disk, and so on. The data that needs to be encrypted includes an operation system of the Domain U, and may further include data in a data disk that needs to be encrypted by the user. For the data that does not need to be encrypted, the hypervisor may boot these programs one by one, for example, by loading. Because the boot loader program does not need to be encrypted, the boot loader module including the boot loader program may be booted after loading.

It may be understood that, the foregoing boot procedure and pre-boot operation of the cloud server may be implemented by using the existing technologies. Reference may be made to an existing process for the specific contents.

The hypervisor may provide the transmission channel for the Domain 0 and Domain U in a manner of sharing memory. For example, a stipulated shared memory space is allocated to each Domain U in the hypervisor. The memory space may be shared by the Domain 0 and the corresponding Domain U, so that the Domain U and the Domain 0 exchange data through the corresponding memory space.

Step 202: The encrypting/decrypting module in the boot loader module sends a key request message to the front-end key transferring module.

Step 203: The front-end key transferring module in the boot loader module sends the key request message to the back-end key transferring module in the Domain 0 through the transmission channel provided by the hypervisor.

For example, after booting the MBR, the hypervisor triggers sending of the key request message by the boot loader module.

The front-end key transferring module in each Domain U may send a key request message to the Domain 0 through the allocated shared memory space.

Step 204: The back-end key transferring module adds identification information of the Domain U to the key request message, and sends the key request message to the encryption management module.

The identification information of the Domain U may be determined according to information of the shared memory which the key request message is from. For example, the key request message is from a first memory and the Domain 0 has allocated the first memory to a first Domain U during configuration. Then it may be determined that the identification information of the Domain U is identification information of the first Domain U.

Step 205: The encryption management module forwards the key request message including the identification information of the Domain U to the key management module.

Step 206: The key management module determines a corresponding key according to the identification information of the Domain U.

The key management module is a module that manages a key of each Domain U, and stores each Domain U and its corresponding key.

Step 207: The key management module returns the key to the encryption management module.

Step 208: The encryption management module returns the key to the back-end key transferring module.

Step 209: The back-end key transferring module returns the key to the front-end key transferring module through the transmission channel in the hypervisor.

In addition, if decryption processing is performed on different Domain Us in parallel, a message of the returned key may further carry identification information of a corresponding Domain U. Definitely, if decryption processing is performed on each Domain U serially, identification information of a Domain U may not be carried.

Step 210: The front-end key transferring module sends the key to the encrypting/decrypting module.

Step 211: The encrypting/decrypting module in the boot loader module decrypts an operation system file of the Domain U according to the key received by front-end key transferring module; and the operation system is booted after the decryption.

For example, the boot loader module may first read the encrypted operation system from the magnetic disk and then decrypt the operation system by using the obtained key.

In this embodiment, by establishing the transmission channel between the Domain 0 and the Domain U in the hypervisor, a channel connection between the Domain U and the cloud platform may be implemented, so that the key may be obtained from the cloud platform, thereby implementing the decryption and boot of the operation system.

Figure 4:
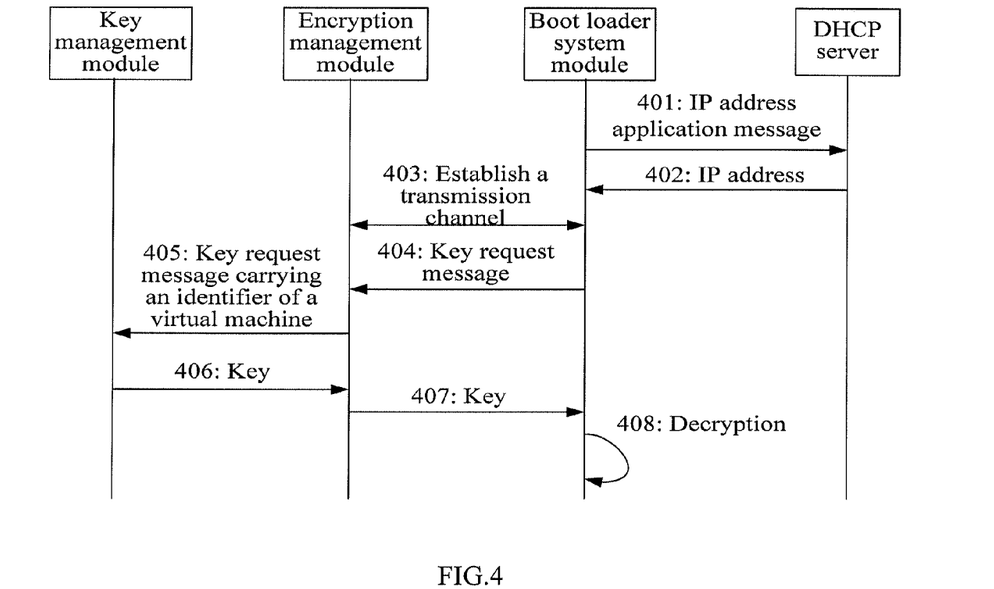
FIG. 4 is a schematic flow chart of a key transmission method of a virtual machine under full disk encryption during pre-boot according to another embodiment of the present disclosure.
Figure 5:
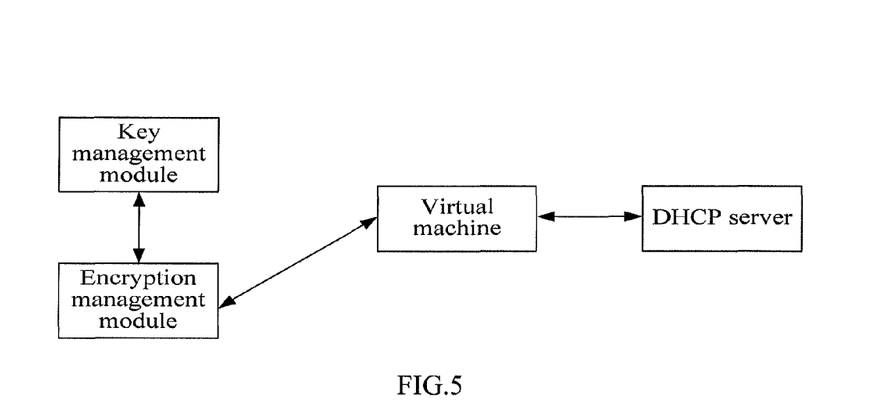
FIG. 5 is a schematic structural diagram of a system corresponding to FIG. 4.

FIG. 4 is a schematic flow chart of a key transmission method of a virtual machine under full disk encryption during pre-boot according to another embodiment of the present disclosure, and FIG. 5 is a schematic structural diagram of a system corresponding to FIG. 4. In this embodiment, that a Domain U obtains an IP address and establishes a transmission channel with a cloud platform according to the IP address is taken as an example.

A difference from the foregoing embodiment is that, in this embodiment, a system volume file of each Domain U includes a boot loader operation system (boot loader OS), which is used to replace the boot loader program in the foregoing embodiment. The boot loader OS is a micro operation system, which not only has a function of the boot loader program, but also has the following functions:

(1) network interface card drive: capable of utilizing a function of a virtual network interface card obtained by virtualization by a vBIOS;

(2) dynamic host configuration protocol (Dynamic Host Configuration Protocol, DHCP) client function: capable of applying to a DHCP server for allocating an IP address; and (3) TCP/UDP/IP protocol stack: capable of establishing a secure IP channel, for example, a secure sockets layer (Secure Sockets Layer, SSL) channel, with an encryption management module of the cloud platform, so as to obtain a key.

Because the foregoing boot loader OS is set, and the boot loader OS may apply to the DHCP server for the IP address via a virtual network interface card and establish a connection with an encryption management platform according to the IP address. Therefore, in this embodiment, there is no need to establish a transmission channel via the hypervisor.

After a cloud server is booted, a Domain 0 may be booted.

The cloud platform performs a pre-boot operation on the Domain U and boots a boot loader OS module during a pre-boot operation procedure.

Similar to the processing on the boot loader, the boot loader OS may be set in the system volume file and the boot loader OS is not encrypted. Therefore, the boot loader OS module may be booted during the pre-boot procedure.

Subsequently, referring to FIG. 4, this embodiment includes:

Step 401: A boot loader operation system (boot loader OS) module sends an IP address application message to a DHCP server via a virtual network interface card.

Step 402: The DHCP server returns an allocated IP address to the boot loader OS module.

Step 403: The boot loader OS module establishes a transmission channel with an encryption management module according to the obtained IP address.

Step 404: The boot loader OS module sends a key request message to the encryption management module through the established transmission channel, where the key request message carries identification information of a Domain U.

Step 405: The encryption management module sends the key request message carrying the identification information of the Domain U to the key management module.

Step 406: The key management module determines a corresponding key according to the identification information of the Domain U, and returns the key to the encryption management module.

Step 407: The encryption management module returns the key to the boot loader OS module through the established transmission channel.

In addition, if decryption processing is performed on different Domain Us in parallel, a message of the returned key may further carry identification information of a corresponding Domain U. Definitely, if decryption processing is performed on each Domain U serially, identification information of a Domain U may not be carried.

Step 408: The boot loader OS module decrypts an operation system of the Domain U by using the key and boots the operation system.

Because the boot loader OS has a function of the boot loader, a processing process similar to that of the boot loader in the foregoing embodiment may implement the decryption and boot of the operation system.

In this embodiment, by setting the boot loader OS, the IP address is obtained and the transmission channel between the Domain 0 and the Domain U is established, thereby implementing a channel connection between the Domain U and the cloud platform, so that the key may be obtained from the cloud platform, implementing the decryption and boot of the operation system.

A decryption process is described in the foregoing, and an encryption process may be executed as follows. It may be understood that, the following encryption process may be applied before the foregoing decryption process, that is, after booting the operation system normally, the virtual machine may perform the full disk encryption on data. The virtual machine may be turned off after the full disk encryption, and when the virtual machine needs to be booted again next time, the foregoing decryption process may be used for processing in a pre-boot phase when the virtual machine is booted again.

Figure 6:
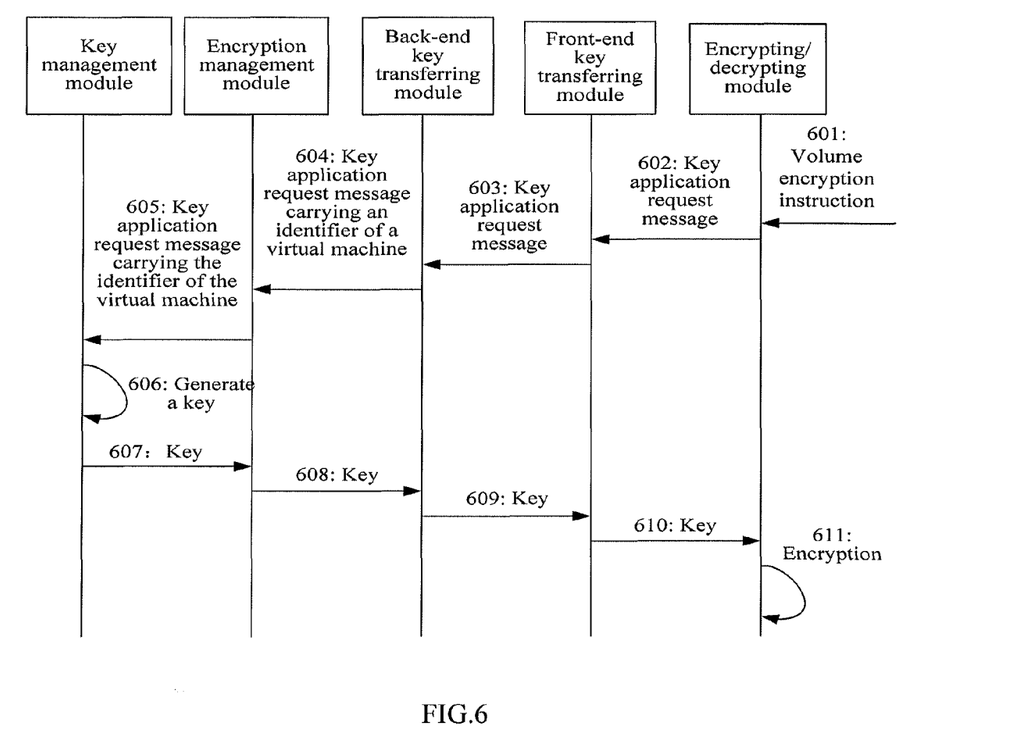
FIG. 6 is a schematic flow chart of an encryption method according to an embodiment of the present disclosure.

FIG. 6 is a schematic flow chart of an encryption method according to an embodiment of the present disclosure, including:

Step 601: An encrypting/decrypting module of an encryption agent module receives a volume encryption instruction.

Step 602: The encrypting/decrypting module sends a key application request message to a front-end key transferring module of the encryption agent module.

Step 603: The front-end key transferring module of the encryption agent module sends the key application request message to a back-end key transferring module in a Domain 0 through a transmission channel in a hypervisor.

Step 604: The back-end key transferring module adds identification information of a Domain U to the key application request message, and sends the key application request message to the encryption management module.

The back-end key transferring module may determine the identification information of the Domain U according to information of a shared memory.

Step 605: The encryption management module forwards the key application request message including the identification information of the Domain U to a key management module.

Step 606: The key management module generates a corresponding key according to the identification information of the Domain U.

Step 607: The key management module returns the key to the encryption management module.

Step 608: The encryption management module returns the key to the back-end key transferring module.

Step 609: The back-end key transferring module returns the key to the front-end key transferring module through the transmission channel in the hypervisor.

In addition, if decryption processing is performed on different Domain Us in parallel, a message of the returned key may further carry identification information of a corresponding Domain U. Definitely, if decryption processing is performed on each Domain U serially, identification information of a Domain U may not be carried.

Step 610: The front-end key transferring module sends the key to the encrypting/decrypting module.

Step 611: The encrypting/decrypting module encrypts a volume by using the key, that is, performs full disk encryption on data of a virtual machine by using the key.

In this embodiment, reference may be made to the embodiment shown in FIG. 2 for establishment of the transmission channel in the hypervisor and determination of the identification information of the Domain U by the Domain 0.

Figure 7:
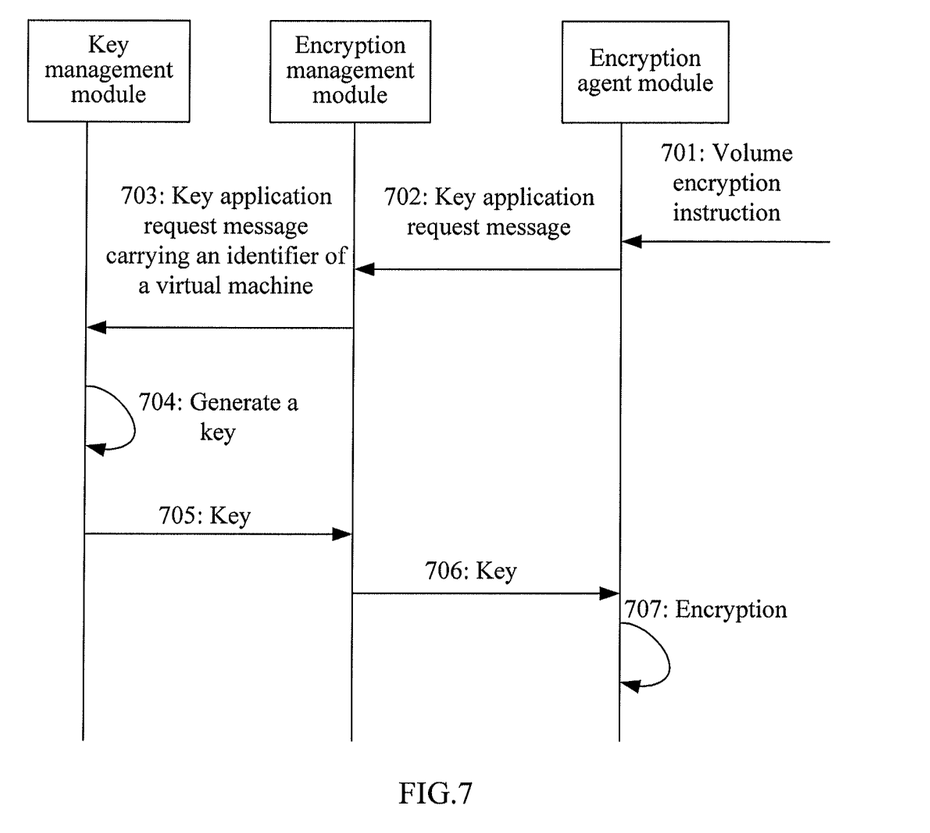
FIG. 7 is a schematic flow chart of an encryption method according to anther embodiment of the present disclosure.

FIG. 7 is a schematic flow chart of an encryption method according to another embodiment of the present disclosure. Since an operation system of a Domain U is already booted during encryption, the Domain U may obtain an IP address, thereby establishing a connection with a cloud platform side. In this embodiment, establishing the connection between the Domain U and a cloud platform is taken as an example. This embodiment includes:

Step 701: An encryption agent module receives a volume encryption instruction.

Step 702: The encryption agent module sends a key application request message including identification information of a Domain U to an encryption management module through an established transmission channel.

Step 703: The encryption management module sends the key application request message including the identification information of the Domain U to a key management module.

Step 704: The key management module generates a corresponding key according to the identification information of the Domain U.

Step 705: The key management module returns the key to the encryption management module.

Step 706: The encryption management module returns the key to the encryption agent module through the established transmission channel.

In addition, if decryption processing is performed on different Domain Us in parallel, a message of the returned key may further carry identification information of a corresponding Domain U. Definitely, if decryption processing is performed on each Domain U serially, identification information of a Domain U may not be carried.

Step 707: The encryption agent module encrypts a volume by using the key, that is, performs full disk encryption on data of a virtual machine by using the key.

In addition, in the foregoing embodiment, the identification information of the Domain U may be generated by using the following manner: first, when an encryption agent is installed, the encryption agent may generate a unique identifier according to some information (for example, MAC of the VM+some random numbers) by following a certain private algorithm. The identifier is retained by the encryption management module during registration of the encryption agent, is sent to the key management system, and is in a one-to-one correspondence with the key.

Figure 8:
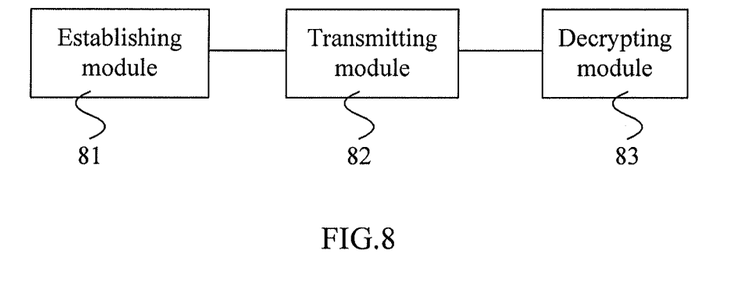
FIG. 8 is a schematic structural diagram of a key transmission device of a virtual machine under full disk encryption during pre-boot according to an embodiment of the present disclosure.

An encryption agent program should write some information, for example, MAC and random number information, at a certain location of a hard disk. Subsequently, a dynamic encrypting/decrypting module in a boot Loader OS obtains this identifier by calculation according to the information by following a private algorithm, and then carries this identifier in a key application message. FIG. 8 is a schematic structural diagram of a key transmission device of a virtual machine under full disk encryption during pre-boot according to the present disclosure. In this embodiment, the device may be a Domain U. The device includes an establishing module 81, a transmitting module 82, and a decrypting module 83. The establishing module 81 is configured to perform a pre-boot operation on the virtual machine in a full disk encryption state, and establish a transmission channel with a cloud platform during the pre-boot, where the cloud platform is configured to provide a key. The transmitting module 82 is configured to request a key from the cloud platform through the transmission channel, and receive the key sent by the cloud platform. The decrypting module 83 is configured to decrypt an operation system by using the key and boot the operation system.

The establishing module is a boot loader module. The boot loader module is configured to determine a transmission channel which is allocated to the virtual machine and is in a hypervisor, and obtain the transmission channel between the virtual machine and the cloud platform through the transmission channel which is allocated to the virtual machine and is in the hypervisor.

For example, in an XEN scenario, the boot loader module in the Domain U may establish a transmission channel with a Domain 0 via the hypervisor. The Domain 0 may obtain an IP address after being booted and may also establish a transmission channel with the cloud platform according to the IP address. Therefore, the Domain U may establish the transmission channel with the cloud platform via the Domain 0.

The transmitting module is configured to:

send a key request message to the cloud platform through the transmission channel in the hypervisor, where the key request message carries identification information of the virtual machine, and receive a key returned by the cloud platform, where the key is determined by the cloud platform according to the identification information of the virtual machine.

The establishing module is a boot loader system module. The boot loader system module is configured to apply to a DHCP server for an IP address after the boot loader operation system is booted, and establish the transmission channel with the cloud platform according to the IP address.

The transmitting module is configured to: send the key request message to the cloud platform through the established IP channel, where the key request message carries the identification information of the virtual machine, and receive the key returned by the cloud platform, where the key is determined by the cloud platform according to the identification information of the virtual machine.

The transmitting module is configured to: send the key request message to a host through the transmission channel in the hypervisor, and send the key request message to the cloud platform via an IP connection channel between the host and the cloud platform, where the host finishes booting, obtains an IP address, and establishes the IP connection channel with the cloud platform before the virtual machine is pre-booted.

In this embodiment, the device may further include an encrypting module, configured to, after a previous normal boot of the operation system, send a key request message carrying the identification information of the virtual machine to the cloud platform through the transmission channel in the hypervisor, receive the key determined according to the identification information of the virtual machine and sent by the cloud platform, and perform full disk encryption processing on data of the virtual machine by using the key; or, after a previous normal boot of the operation system, obtain the IP address, establish the IP connection with the cloud platform according to the IP address, send the key request message carrying the identification information of the virtual machine to the cloud platform through the IP connection, receive the key determined according to the identification information of the virtual machine and sent by the cloud platform, and perform full disk encryption processing on data of the virtual machine by using the key.

In addition, the foregoing decrypting module and the encrypting module may belong to one same physical module, that is, be equivalent to the encrypting/decrypting module in the foregoing method.

In this embodiment, during a pre-boot phase, the transmission channel with the cloud platform providing the key is established, implementing the key transmission during the pre-boot phase, so that the virtual machine is capable of obtaining the key, thereby decrypting the operation system of the virtual machine and booting the operation system of the virtual machine, avoiding halting in the pre-boot phase due to incapability of obtaining the key.

Persons of ordinary skill in the art may understand that all or part of the steps of the foregoing method embodiments may be implemented by a program instructing relevant hardware. The foregoing program may be stored in a computer readable storage medium. When the program is executed, the steps of the foregoing method embodiments are executed. The foregoing storage medium may include various media that may store program codes, such as an ROM, an RAM, a magnetic disk, or a compact disk, and so on.

Finally, it should be noted that the foregoing embodiments are merely used for illustrating the solutions of the present disclosure, but not intended to limit the present disclosure. Although the present disclosure has been illustrated in detail with reference to the foregoing embodiments, persons of ordinary skill in the art should understand that, they may still make modifications to the solutions recorded in each foregoing embodiment, or make equivalent replacements to part of the features in it, where such modifications or replacements do not make the nature of corresponding solutions depart from the scope of the solutions of each embodiment of the present disclosure.

What is claimed is:

1. A key transmission method of a user virtual machine, comprising:
    sending, by the user virtual machine, a key request message to a host virtual machine through a transmission channel in a hypervisor, wherein the transmission channel in the hypervisor is allocated to the user virtual machine, a host operating system of the host virtual machine is not encrypted, and the user virtual machine is under full disk encryption during a pre-boot;
    sending, by the host virtual machine, the key request message to a cloud platform through an IP connection channel between the host virtual machine and the cloud platform, wherein the host virtual machine finishes booting the host operating system, obtains an IP address to establish the IP connection channel with the cloud platform without obtaining an IP address of the user virtual machine before the user virtual machine is booted, and wherein the cloud platform is configured to provide a key;
    receiving, by the host virtual machine, the key from the cloud platform through the IP connection channel;
    sending, by the host virtual machine, the key to the user virtual machine through the transmission channel in the hypervisor;
    receiving, by the user virtual machine, the key sent by the host virtual machine; and
    decrypting, by the user virtual machine, a user operating system by using the key and booting the user operating system.

2. The method according to claim 1,
    wherein the key request message carries identification information of the user virtual machine; and
    the key is determined by the cloud platform according to the identification information of the user virtual machine.

3. The method according to claim 1, wherein sending the key request message to the host virtual machine through the transmission channel in the hypervisor comprises:
    sending, by the user virtual machine, the key request message to the host virtual machine through sharing memory in the hypervisor.

4. The method according to claim 1, wherein before the user virtual machine is pre-booted, the method further comprises:
    after a previous normal boot of the user operating system, sending, by the user virtual machine, another key request message carrying identification information of the user virtual machine to the cloud platform through the transmission channel in the hypervisor, receiving a key determined according to the identification information of the user virtual machine and sent by the cloud platform, and performing full disk encryption processing on data of the user virtual machine by using the key.

5. A cloud server, wherein the cloud server comprises a memory and a processor:
    the memory having program routines stored therein, the program routines configuring the processor to include:
        a user virtual machine sending a key request message to a host virtual machine through a transmission channel in a hypervisor, wherein the transmission channel in the hypervisor is allocated to the user virtual machine, a host operating system of the host virtual machine is not encrypted, and the user virtual machine is under full disk encryption during a pre-boot; and
        the host virtual machine sending the key request message to a cloud platform through an IP connection channel between the host virtual machine and the cloud platform, wherein the host virtual machine finishes booting a host operating system, obtains an IP address to establish the IP connection channel with the cloud platform without obtaining an IP address of the user virtual machine before the user virtual machine is booted, receiving the key from the cloud platform through the IP connection channel, and sending the key to the user virtual machine through the transmission channel in the hypervisor;
        wherein the user virtual machine receives the key sent by the host virtual machine and decrypts a user operating system by using the key and boots the user operating system.

6. The cloud server according to claim 5, wherein after a previous normal boot of the user operating system, the user virtual machine further sending another key request message carrying identification information of the user virtual machine to the cloud platform through the transmission channel in the hypervisor, receiving the key determined according to the identification information of the user virtual machine and sent by the cloud platform, and performing full disk encryption processing on data of the user virtual machine by using the key.

7. The cloud server according to claim 5, wherein the key request message carries identification information of the user virtual machine, and the key is determined by the cloud platform according to the identification information of the user virtual machine.

* * * * *